(12) United States Patent
Mo (10) Patent No.: US 11,175,798 B2
(45) Date of Patent: Nov. 16, 2021

(54) MOVING METHOD OF FLOATING TOOLBAR IN TOUCH DISPLAY APPARATUS AND TOUCH DISPLAY APPARATUS

(71) Applicant: SHENZHEN HITEVISION TECHNOLOGY CO., LTD., Guangdong (CN)

(72) Inventor: Weiye Mo, Guangdong (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/960,232

(22) PCT Filed: Jan. 7, 2019

(86) PCT No.: PCT/CN2019/070557
§ 371 (c)(1),
(2) Date: Jul. 6, 2020

(87) PCT Pub. No.: WO2020/124697
PCT Pub. Date: Jun. 25, 2020

(65) Prior Publication Data
US 2021/0064196 A1   Mar. 4, 2021

(30) Foreign Application Priority Data
Dec. 19, 2018 (CN) .......................... 201811559781.2

(51) Int. Cl.
*G06F 3/048* (2013.01)
*G06F 3/041* (2006.01)
(Continued)

(52) U.S. Cl.
CPC .......... *G06F 3/0482* (2013.01); *G06F 3/0488* (2013.01); *G06F 3/04842* (2013.01); *G06F 2203/04104* (2013.01)

(58) Field of Classification Search
CPC .. G06F 3/0482; G06F 3/04842; G06F 3/0488; G06F 2203/04104
See application file for complete search history.

(56) References Cited

U.S. PATENT DOCUMENTS

2010/0122194 A1* 5/2010 Rogers ................. G06F 3/0482
715/769
2010/0315366 A1* 12/2010 Lee ....................... G06F 3/0486
345/173
(Continued)

FOREIGN PATENT DOCUMENTS

CN       103176729 A     6/2013
CN       105335069 A     2/2016
(Continued)

OTHER PUBLICATIONS

PCT International Search Report for PCT/CN2019/070557, dated Sep. 19, 2019, 12 pages.
(Continued)

*Primary Examiner* — Hugo Molina
(74) *Attorney, Agent, or Firm* — Law Offices of Liaoteng Wang (57) ABSTRACT

A moving method of a floating toolbar and a touch display apparatus. The method includes: acquiring touch data on a touch screen (S1); acquiring, according to the touch data, touch position information of touch points simultaneously touched, number information of the touch points simultaneously touched and simultaneous touch duration information of the touch points simultaneously touched (S2); determining whether a number of the touch points simultaneously touched meets a first preset condition and whether a simultaneous touch duration of the touch points simultaneously touched meets a second preset condition (S3), and when both the first preset condition and the second preset condition are met, proceeding to step S4; determining a target (Continued)

position of the floating toolbar according to touch positions of the touch points simultaneously touched (S4); moving the floating toolbar to the target position (S5).

20 Claims, 4 Drawing Sheets (51) Int. Cl.
*G06F 3/00* (2006.01)
*G06F 3/0482* (2013.01)
*G06F 3/0484* (2013.01)
*G06F 3/0488* (2013.01)

(56) References Cited

U.S. PATENT DOCUMENTS

| | | | | |
|---|---|---|---|---|
| 2013/0055167 | A1* | 2/2013 | Leong | G06F 16/9038 |
| | | | | 715/854 |
| 2013/0321308 | A1* | 12/2013 | Lee | G06F 3/041 |
| | | | | 345/173 |
| 2014/0201672 | A1* | 7/2014 | Borzello | G06F 3/04842 |
| | | | | 715/779 |
| 2015/0248206 | A1* | 9/2015 | Liu | G06F 3/041 |
| | | | | 715/770 |
| 2015/0301737 | A1* | 10/2015 | Koyama | G06F 3/0416 |
| | | | | 715/810 |
| 2016/0117000 | A1* | 4/2016 | Won | G06F 3/04842 |
| | | | | 345/157 |
| 2016/0179289 | A1* | 6/2016 | Takamura | G06F 3/04883 |
| | | | | 345/173 |
| 2017/0168655 | A1* | 6/2017 | Jann | G06F 3/0482 |
| 2018/0011688 | A1 | 1/2018 | Wei et al. | |
| 2019/0250773 | A1* | 8/2019 | Miyaki | A63F 13/212 |

FOREIGN PATENT DOCUMENTS

| | | |
|---|---|---|
| CN | 105630377 A | 6/2016 |
| CN | 106527858 A | 3/2017 |
| CN | 106796480 A | 5/2017 |
| CN | 107239216 A | 10/2017 |
| CN | 107688420 A | 2/2018 |
| CN | 107728910 A | 2/2018 |
| CN | 108268194 A | 7/2018 |
| WO | 2009126710 A2 | 10/2009 |

OTHER PUBLICATIONS

The First Office Action and search report for Chinese application 201811559781.2, dated Feb. 2, 2021, 25 pages.

* cited by examiner

MOVING METHOD OF FLOATING TOOLBAR IN TOUCH DISPLAY APPARATUS AND TOUCH DISPLAY APPARATUS

CROSS REFERENCE

This application is a National Stage of International Application No. PCT/CN2019/070557, filed on Jan. 7, 2019, which claims priority to Chinese Patent Application No. 201811559781.2, filed on Dec. 19, 2018, both of which are hereby incorporated by reference in their entireties.

TECHNICAL FIELD

The present application relates to the field of touch control technology, and in particular, to a moving method of a floating toolbar in a touch display apparatus. The present application also relates to a touch display apparatus.

BACKGROUND

Currently, on equipment such as IOS or Android devices, for most of the floating toolbars, one of the following two technical representation forms is employed: a first form is that the toolbar is touched and dragged to a user's desired position, and then utilization of a specific function is performed; a second form is that the toolbar is fixed on edges of the two sides of the screen, but can be moved up and down when dragged by the user and utilization of a specific function can be performed. The realization of either of the above two types of moving function requires to touch and drag the floating toolbar, and for electric devices with small screen size such as mobile phones and tablets, the above two forms of the moving operation of the floating toolbar can substantially satisfy the convenience for use by the user, however, for electronic devices with large size interactive screens (for example, having a similar size as a TV screen), the moving operation of the toolbar by the user would be quite inconvenient, and the user is required to find the position of the toolbar first, then go there to touch and drag the toolbar, which significantly reduces the convenience of the floating toolbar which should be the most prominent feature thereof.

SUMMARY

An aspect of the present application provides a moving method of a floating toolbar in a touch display apparatus, including:

S1: acquiring touch data on a touch screen;

S2: acquiring, according to the touch data, touch position information of touch points simultaneously touched, number information of the touch points simultaneously touched and simultaneous touch duration information of the touch points simultaneously touched;

S3: determining whether a number of the touch points simultaneously touched meets a first preset condition and whether a simultaneous touch duration of the touch points simultaneously touched meets a second preset condition, and when both the first preset condition and the second preset condition are met, proceeding to step S4;

S4: determining a target position of the floating toolbar according to touch positions of the touch points simultaneously touched;

S5: moving the floating toolbar to the target position.

Preferably, in step S4, the target position is within a predetermined distance from any one of the touch points simultaneously touched.

Preferably, in step S4, the target position is located between the touch points simultaneously touched.

Preferably, in step S4, the target position is located at a middle position between two touch points of the touch points simultaneously touched.

Preferably, in step S5, before moving the floating toolbar, whether the floating toolbar is in an expanded state is determined first, and when it is determined the floating toolbar is in the expanded state, an operation of collapsing the floating toolbar is performed before moving the floating toolbar.

Preferably, in step S5, after moving the floating toolbar is completed, the floating toolbar is placed in the expanded state.

Preferably, in step S5, a collapsing process of the floating toolbar is displayed in a form of animation.

Preferably, in step S5, an expanding process of the floating toolbar is displayed in a form of animation.

Preferably, the first preset condition includes: whether the number of the touch points simultaneously touched is greater than or equal to a first threshold; and/or, the second preset condition includes: whether the simultaneous touch duration of the touch point simultaneously touched is greater than or equal to a second threshold.

Preferably, the first threshold is in a range of 2 to 5, preferably 2; and/or the second threshold is in a range of is to 3 s, preferably 2 s.

Preferably, where, in step S2, moving distance information of the touch points simultaneously touched is also acquired according to the touch data;

in step S3, it is also determined whether a moving distance of any one of the touch points is less than or equal to a third threshold, and the method proceeds to step S4 only when a determination result is true.

Preferably, the third threshold is in a range of 10 pixels to 50 pixels, preferably 25 pixels.

Preferably, in the step S2, spacing information between the touch points simultaneously touched is also acquired according to the touch data;

in step S3, it is also determined whether a spacing between any two of the touch points is less than or equal to a fourth threshold, and the method proceeds to step S4 only when a determination result is true.

Preferably, the fourth threshold is in a range of 1 cm to 25 cm, preferably in a range of 5 cm to 15 cm.

Preferably, in step S5, the floating toolbar is moved along a curve path.

Preferably, the curve path is determined according to a second-order Bezier curve.

Preferably, in step S5, a coordinates (X, Y) of a control point of the second-order Bezier curve is dynamically calculated, so that the second-order Bezier curve corresponding to the curve path is completely within the screen.

Preferably, in step S5, a process of dynamically calculating the coordinates (X, Y) of the control point of the second-order Bezier curve includes:

determining a screen edge closest to a starting position and the target position of the floating toolbar as a reference edge;

determining whether distances from the starting position and the target position to the reference edge are both greater than or equal to a fifth threshold;

when the distances are not both greater than or equal to the fifth threshold, setting the control point on a first side of a connecting line between the starting position and the target position, where, the first side refers to a side of the connecting line away from the reference edge.

Preferably, in step S5, a process of dynamically calculating the coordinates (X, Y) of the control point of the second-order Bezier curve includes:

selecting a left edge or an upper edge of the screen as a reference edge, and determining whether a starting position and the target position of the floating toolbar both meet the following condition: distances from the starting position and the target position of the floating toolbar to the reference edge are greater than or equal to a fifth threshold; when the distances are not both greater than or equal to the fifth threshold, setting the control point on a first side of a connecting line between the starting position and the target position; when the distances are both greater than or equal to the fifth threshold, setting the control point on a second side of the connecting line; where, the first side refers to a side of the connecting line away from the reference edge, and the second side refers to a side of the connecting line close to the reference edge.

Preferably, in step S5, a process of selecting the reference edge includes:

S100: calculating coordinate variation amounts from the starting position to the target position, where an X direction coordinate variation amount is recorded as tX, and a Y direction coordinate variation amount is recorded as tY; where, tX=tarX−curX, tY=tarY−curY, tarX and tarY are an X direction coordinate value and a Y direction coordinate value of the target position respectively, and curX and curY are an X direction coordinate value and a Y direction coordinate value of the starting position respectively;

S200: comparing tX with tY, and when tX>tY, selecting the upper edge of the screen as the reference edge, otherwise, selecting the left edge of the screen as the reference edge.

Preferably, in step S5, when tX>tY holds, the coordinates of the control point (X, Y) is determined according to the following steps:

S300: determining whether curY and tarY both are greater than or equal to the fifth threshold, if so, proceeding to step S400, and if not, proceeding to step S500;

S400: setting a Y direction coordinate of the control point as: Y=Math.min(curY, tarY)−the fifth threshold; setting an X direction coordinate of the control point as: X=(curX+tarX)/2; where, Math.min is a minimum value function;

S500: setting the Y direction coordinate of the control point as: Y=Math.max (curY, tarY)+the fifth threshold; setting the X direction coordinate of the control point as: X=(curX+tarX)/2; where, Math.max is a maximum value function.

Preferably, in step S5, when tX>tY does not hold, the coordinate of the control point (X, Y) is determined according to the following steps:

S600: determining whether curX and tarX both are greater than or equal to the fifth threshold, if so, proceeding to step S700, and if not, proceeding to step S800;

S700: setting an X direction coordinate of the control point as: X=Math.min(curX, tarX)−the fifth threshold; setting a Y direction coordinate of the control point as: Y=(curY+tarY)/2; where, Math.min is a minimum value function;

S800: setting the X direction coordinate of the control point as: X=Math.max (curX, tarX)+the fifth threshold; setting the Y direction coordinate of the control point as: Y=(curY+tarY)/2; where, Math.max is a maximum value function.

Preferably, the fifth threshold is in a range of 5% to 20% of a screen resolution, preferably 10% of the screen resolution.

Another aspect of the present application provides a touch display apparatus having a touch screen, where the touch screen displays a floating toolbar thereon when in a working state, and where, when more than two touch points on the touch screen are simultaneously touched, the touch display apparatus is configured to move the floating toolbar using the moving method as described above.

Preferably, the touch display apparatus is a smart interactive tablet or an interactive display screen.

BRIEF DESCRIPTION OF THE DRAWINGS

The present application will be further described in combination with the drawings and preferred embodiments, in which.

DETAILED DESCRIPTION

One technical problem to be solved in the present application is how to provide a moving method of a floating toolbar for curing the above defects of the prior art, so as to overcome the defect of the poor convenience when the application toolbar is moved in a large screen touch display apparatus. And another technical problem to be solved by the present application is how to provide a touch display apparatus which can facilitate the user to move and use the floating toolbar.

Now, in combination with the drawings, preferred embodiments of the present application are described in detail.

Figure 1:
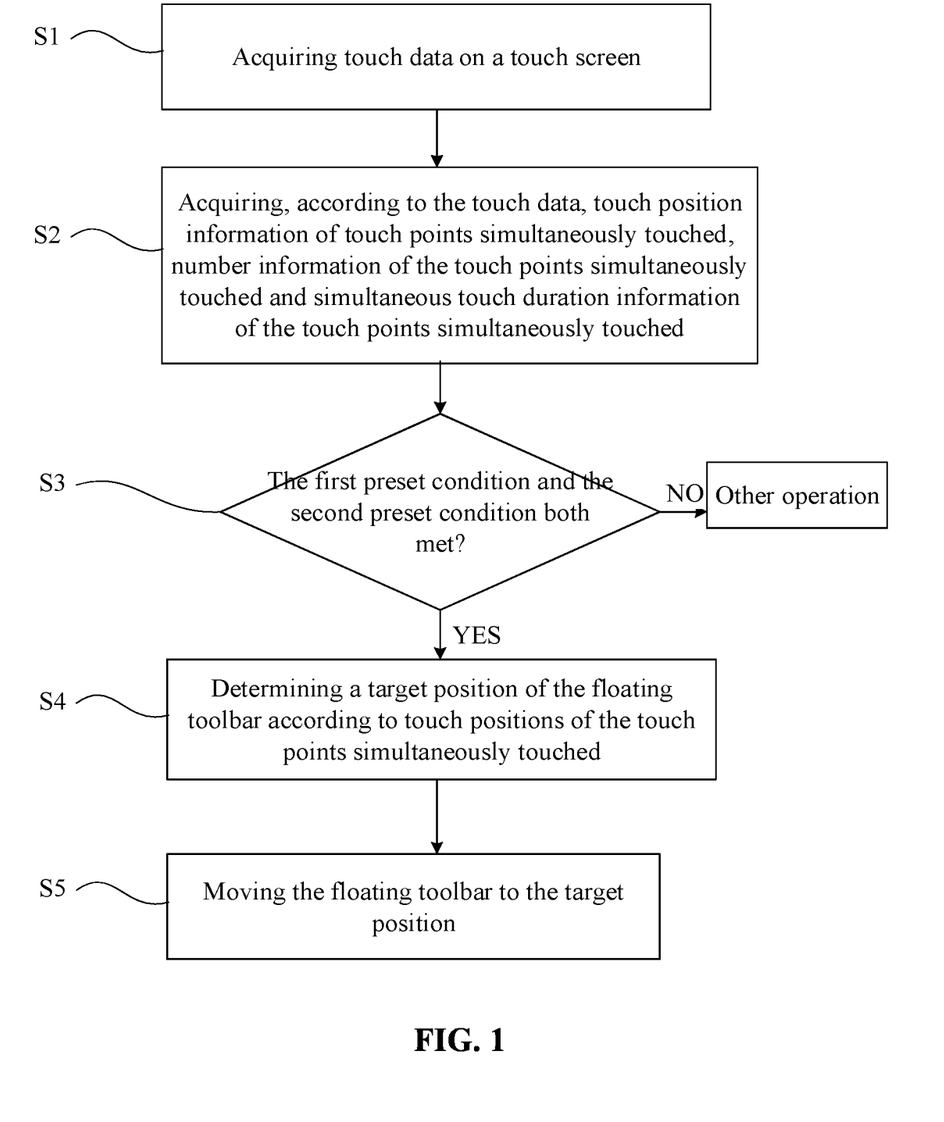
FIG. 1 is a control flowchart of a moving method of a floating toolbar according to a preferred embodiment of the present application.

First, referring to FIG. 1, the moving method of the floating toolbar in the touch display apparatus according to a preferred embodiment of the present application includes the following steps:

S1: acquiring touch data on a touch screen;

S2: acquiring, according to the touch data, touch position information of touch points simultaneously touched, number information of the touch points simultaneously touched and simultaneous touch duration information of the touch points simultaneously touched;

S3: determining whether a number of the touch points simultaneously touched meets a first preset condition and whether a simultaneous touch duration of the touch points simultaneously touched meets a second preset condition, and when both the first preset condition and the second preset condition are met, proceeding to step S4;

S4: determining a target position of the floating toolbar according to touch positions of the touch points simultaneously touched;

S5: moving the floating toolbar to the target position.

In step S1, when the user touches the touch screen of the corresponding touch display apparatus, the main control of the touch display apparatus may acquire the touch data on the touch screen.

Subsequently, in step S2, the main control acquires the knowledge of whether the touch points simultaneously touched are included according to the obtained touch data, that is, when the user touches the touch screen by multiple fingers (for example, two fingers, three fingers, four fingers, or five fingers) at the same time, the main control may identify this touch manner and determine the position information of the respective touch points, the number of the touch points, and the simultaneous touch duration information, etc. The main control may acquire these information in any order, for example, the number information of the touch points may be acquired before the position information and the duration information. It is easy to understand that when the user touches the touch screen by a single finger and this touch manner is identified by the main control, the main control will control the touch display apparatus to perform regular operations, such as opening or closing the window, or dragging an object, according to the position information and the moving information of the touch point, therefore, the moving method will not proceed to step S2.

After step S2, in step S3, the main control determines whether the above touching by the user to the touch screen meets the preset conditions, that is, whether the number of touch points meets the first preset condition and whether the simultaneous touch duration of the touch points meets the second preset condition, etc., and when each of the above conditions is met, the moving method proceeds to step S4, otherwise, the touch display apparatus is controlled to perform other functions according to the preset conditions instead of the quick movement of the floating toolbar.

In step S4, the main control determines the target position of the floating toolbar according to the touch positions of the touch points simultaneously touched, where the target position is a position the user wants to move the floating toolbar to, which is generally a convenient position for the user to perform operation, such as a position that the user can touch without any walking, for example, the target position may be determined within a surrounding area of the touch points.

Finally, in step S5, the main control moves the floating toolbar to that target position.

Figure 2:
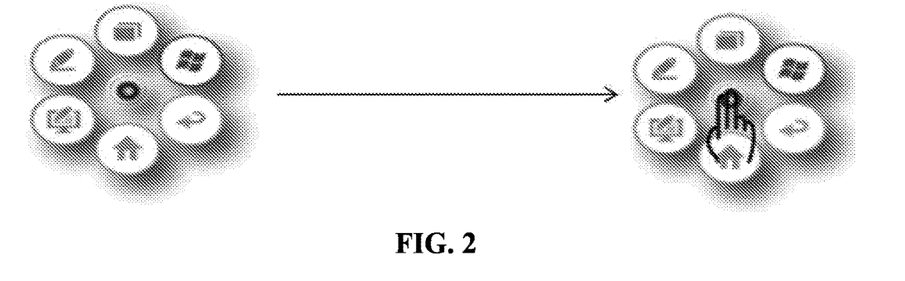
FIG. 2 is a schematic diagram of a representation form of a moving method of a floating toolbar according to a preferred embodiment of the present application.

It can be seen that, when the user performs a specific operation, the user only needs to use two or more fingers (the specific number is depending on preset settings) to simultaneously touch the touch screen and keep the touching for a period of time, then the floating toolbar will automatically move to a position in vicinity of the touch positions of the user, where the movement of the floating toolbar can be quickly completed, regardless of its original position. The process is shown in FIG. 2, where an example of touching by two fingers is taken in FIG. 2 for illustration.

Therefore, the moving method of the floating toolbar according to the present application avoids the inconvenient operations that the user first looks for the floating toolbar, then clicks and drags the floating toolbar to the position suitable for operation, so that the user, standing at any position in front of the touch display apparatus, can quickly move the floating toolbar to a position close at hand, thus greatly improving the user experience. That is to say, the moving method of the floating toolbar according to the present application improves the quickness of moving the toolbar on a large screen, the operations are simple and convenient, and the human-computer interaction is excellent.

Preferably, in step S4, the target position may be set within a predetermined distance from any one of the touch points simultaneously touched. For example, when the user moves the floating toolbar through simultaneously touching the touch screen by two fingers, the target position of the floating toolbar may be set to close to the touch point of any one finger, that is, within the vicinity of the user's hand, as long as it is convenient for the user to subsequently operate the floating toolbar.

Preferably, in step S4, the target position may be set to a position between the touch points simultaneously touched, for example, a position between the two fingers by which the user simultaneously performs the touching, or a position between the three fingers by which the user performs the touching, so that the floating toolbar can actually be moved quickly to a position between the fingers of the user, which makes it very convenient for the user to subsequently operate the floating toolbar, and the user does not need to move the position of the hand.

Preferably, in the step S4, the target position may be set to a middle position of two touch points of the touch points simultaneously touched, so as to simplify the calculation of the target position and facilitate the user to subsequently operate the floating toolbar. For example, when the user moves the floating toolbar through simultaneously touching the touch screen by two fingers, the target position of the floating toolbar may be set to a midpoint between the touch points of the two fingers; while when the user moves the floating toolbar through simultaneously touching the touch screen by three fingers, the target position of the floating toolbar may be set to a middle position between two touch points of the touch points simultaneously touched.

Figure 3:
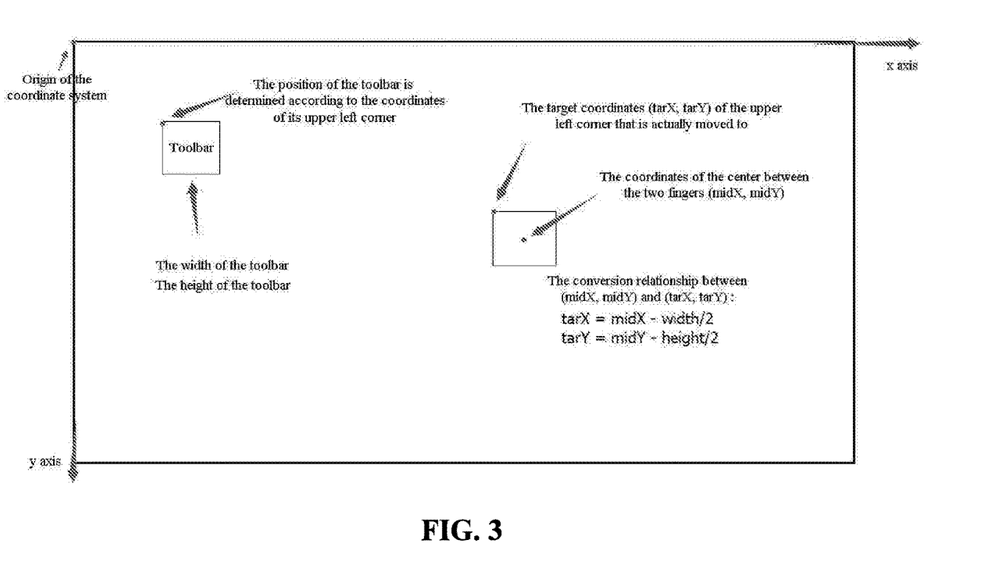
FIG. 3 is a schematic illustration of an Android system coordinate system, a touch center point coordinate and a target coordinate.

As shown in FIG. 3, a touch display apparatus with an Android system installed thereon is taken as an example, where the upper left corner of the touch screen is the origin of the screen coordinate system, and the position of the floating toolbar is determined according to coordinates of its upper left corner. At the same time, the floating toolbar has a width and a height. When the floating toolbar is moved, the center point of the floating toolbar being moved to the above-mentioned target position often generates a better visual effect from the user's perspective. Therefore, the target position coordinates (tarX, tarY) of the upper left corner of the floating toolbar may be calculated through the following conversion:

$$tarX=midX-width/2, tarY=midY-height/2;$$

where midX and midY respectively represent the coordinates of the above-mentioned target position (for example, coordinates of the center between the two fingers as illustrated in the FIG. 3) herein, that is, the coordinates of the center point of the floating toolbar after the completion of the movement.

Of course, in other embodiments, the coordinates of the above-mentioned target position of the floating toolbar may also be directly expressed as (tarX, tarY), without considering the width and the height of the floating toolbar, which would not have any impact on the realization of the moving method according to the present application.

Preferably, in step S5, before the floating toolbar is moved, whether the floating toolbar is in an expanded state is determined first, and when it is determined the floating toolbar is in the expanded state, an operation of collapsing the floating toolbar is performed before moving the floating toolbar. The operations of the present embodiment can simplify the display control of the touch display apparatus, it is not required to move the entire floating toolbar on the screen, so that interference with other contents currently displayed is avoided.

Preferably, in step S5, after moving the floating toolbar is completed, the floating toolbar is placed in the expanded state, so that the user can operate the floating toolbar immediately, thereby further improving the convenience.

Figure 4:
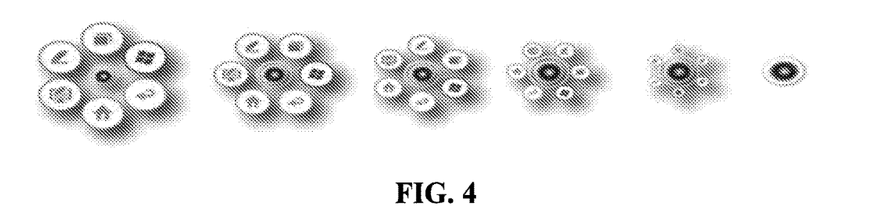
FIG. 4 is an animated schematic diagram of a collapsing process of a floating toolbar according to a moving method of the present application, in which a process from left to right is in chronological order.

Preferably, in step S5, a process of collapsing the floating toolbar is displayed in a form of animation, for example, as shown in FIG. 4, the floating toolbar may be gradually reduced to a size of a collapsed state, and preferably, the size reducing process is accompanied by rotation at an appropriate speed or angle, so as to enhance the visual effect and avoid the monotony of the picture.

Figure 5:
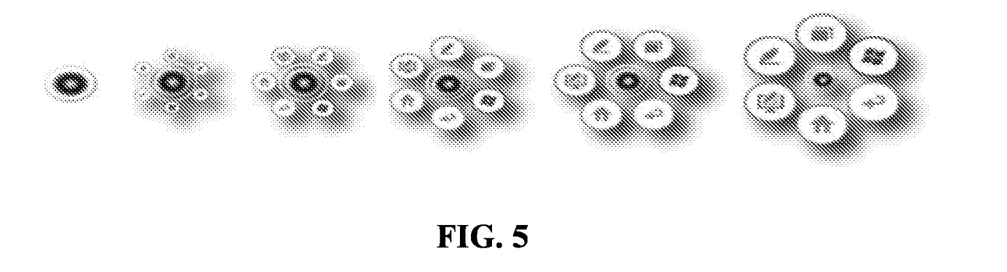
FIG. 5 is an animated schematic diagram of an expanding process of a floating toolbar according to a moving method of the present application, in which a process from left to right is in chronological order.

Preferably, in step S5, a process of expanding the floating toolbar is also displayed in a form of animation. For example, as shown in FIG. 5, the floating toolbar may be gradually enlarged to a size of the expanding state, and preferably, the size enlarging process is also accompanied by rotation at an appropriate speed or angle, for example, the rotation speed is the same as that of the collapsing process and the rotation direction is the opposite to the collapsing process, so as to enhance the visual effect and avoid the monotony of the picture.

Alternatively, the floating toolbar may be gradually collapsed during the moving process (in the first half of the moving path), and then gradually expanded during the moving process (in the second half of the moving path).

Alternatively, it is feasible that the floating toolbar is not collapsed during the entire moving process.

Preferably, in step S3, the first preset condition includes: whether the number of touch points simultaneously touched is greater than or equal to the first threshold; the first threshold is preferably in a range of 2 to 5 (that is, simultaneous touch by multiple fingers on one hand), and more preferably 2 (that is, simultaneous touch by two fingers). In a specific implementation, the main control may determine whether the number of touch points simultaneously touched is the preset number in various equivalent ways. For example, when the simultaneous touch by two fingers is set to be the condition of moving the floating toolbar, the main control can determine whether the number of touch points simultaneously touched is 2, or whether the number of touch points simultaneously touched is greater than 1 and less than 3, which are the same in terms of implementation effect.

Preferably, in step S3, the second preset condition includes: whether the simultaneous touch duration of the touch points simultaneously touched is greater than or equal to the second threshold; the second threshold is preferably in a range of 1 s to 3 s, and more preferably 2 s. That is, when the touch duration of the simultaneous touch by the multiple fingers of the user reaches is or more (preferably 2 s), the quick automatic movement of the floating toolbar may be performed. When the simultaneous touch by multiple fingers is performed but the touch duration does not reach the second threshold, the movement of the floating toolbar is not performed, for example, other corresponding operations may be performed, and if there is no corresponding operation, no operation may be performed.

Preferably, in a preferred embodiment, in the step S2, in addition to acquiring the above-mentioned touch position information, the number information of the touch points simultaneously touched and the simultaneous touch duration information, moving distance information of the respective touch points simultaneously touched is also acquired according to the touch data;

Subsequently, in the step S3, in addition to determining whether the number of touch points meets the first preset condition and whether the simultaneous touch duration meets the second preset condition, it is also determined whether a moving distance of any one of the touch points is less than or equal to a third threshold, and the moving method proceeds to step S4 only when a determination result is true.

That is to say, in the moving method of the floating toolbar of the present application, in addition to setting the two preset conditions of the number of touch points and the simultaneous touch duration, a preset condition of whether each touch point does not move (or only moves in a small range) may also be set, so as to further limit the starting condition of the quick moving function of the floating toolbar, so that the touch control manner of simultaneously touching and moving by multiple fingers is reserved for other operations.

During the specific utilization by the user, as long as the preset number of fingers simultaneously touch the touch screen and remain still for a preset duration, the quick movement of the floating toolbar can be started. However, since it is impossible for a user hand to press on a screen with absolute immobility, in a preferred embodiment, the preset condition of determining whether the immobility happens is set to whether the moving distance is less than or equal to the third threshold, as long as the third threshold is set to a relatively small value (for example, the value may cover a range of position variation caused by the shaking of the finger). Preferably, the third threshold is in a range of 10-50 pixels, and more preferably 25 pixels. Experiments show that when the value of the third threshold is taken according to the above principles, the sensitivity and accuracy can be well balanced, and the user experience is better.

Preferably, in another preferred embodiment, in step S2, in addition to acquiring the above-mentioned touch position information, the number information of the touch points simultaneously touched and the simultaneous touch duration information, spacing information between the touch points simultaneously touched is also acquired according to the touch data;

Subsequently, in the step S3, in addition to determining whether the number of touch points meets the first preset condition and whether the simultaneous touch duration meets the second preset condition, it is also determined whether a spacing between any two of the touch points is less than or equal to a fourth threshold, and the method proceeds to step S4 only when each of the determination results is true.

The spacing between any two of the touch points can reflect whether the corresponding touch points are from a same hand of the same user. Therefore, the fourth threshold may be set to not exceed a maximum fingertip span of a single human hand, for example, the fourth threshold is preferred to be in a range of 1 cm to 25 cm, and more preferably 5 cm to 15 cm, so as to ensure that the quick movement of the floating toolbar can be started only when multi-point touch by a single hand of the user occurs. If the spacing between the touch points simultaneously touched is substantially greater than the fingertip span of a single human hand, then this touch manner is often an accidental touch event, for example, the user accidentally performs touching with the other hand at the same time, or another user performs touching at the same time, therefore, the quick movement of the floating toolbar may not be started for this touch manner. In a specific implementation, the fourth threshold may be converted from distance units (cm) to corresponding pixel units (px) according to the screen size, so as to facilitate the main control for calculation. For example, for an 86 inch screen, 0 cm to 5 cm corresponds to approximately 0 px to 128 px after conversion, and for a 65 inch screen, 0 cm to 5 cm corresponds to approximately 0 px to 96 px after conversion.

In particular, in the moving method of the floating toolbar according to the present application, in order to further improve the aesthetics of the moving process of the floating toolbar, preferably, in step S5, the floating toolbar is moved along a curve path. The curve path may be pre-determined according to a preset rule, or it can be determined randomly before the start of the movement. In addition, the curve path may be a curve bent in one direction, for example it is a circular arc, or a curve bent in two directions, for example, it is an S-shaped curve or a spline curve.

Figure 6:
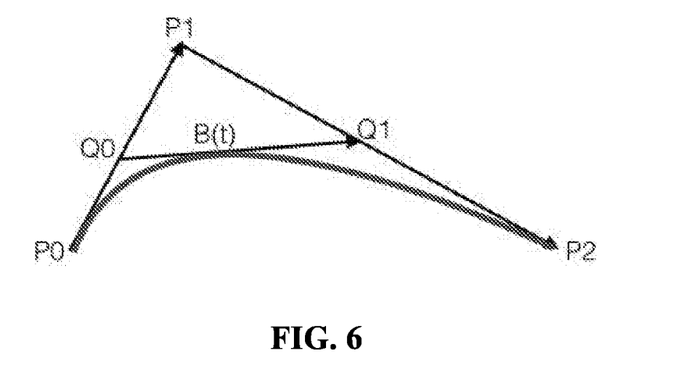
FIG. 6 is a schematic diagram of a second-order Bezier curve involved in a moving method of the present application.

Preferably, in the moving method of the floating toolbar according to the present application, the curve path is determined according to a second-order Bezier curve. The expression of the second-order Bezier curve is:

$$B(t)=(1-t)^2 P_0 + 2t(1-t)P_1 + t^2 P_2, t \in [0,1];$$

$P_0$ represents a starting point of the curve, which corresponds to a starting position (or a current position) of the floating toolbar according to the present application; P2 represents an ending point of the curve, which corresponds to the target position of the floating toolbar according to the present application; $P_1$ represents a control point of the curve, which is used to control the shape and bending degree of the curve.

The schematic diagram of the second order Bezier curve is shown in FIG. 6. In FIG. 6, $Q_0$ and $Q_1$ are points on $P_0 P_1$ and $P_1 P_2$ respectively. When $Q_0$ and $Q_1$ move on $P_0 P_1$ and $P_1 P_2$ respectively in a same pace, that is, the following proportion relationship is always satisfied: $P_0 Q_0 : P_0 P_1 = P_1 Q_1 : P_1 P_2$, then the curve is always tangent to $Q_0 Q_1$. When the starting point $P_0$ and the ending point $P_2$ are known, the shape of the curve can be uniquely determined by determining the control point $P_1$.

By determining the curve path during the movement of the floating toolbar according to the second-order Bezier curve, on the premise of ensuring the aesthetic requirements, the control process can be simplified, the workload of the main control can be reduced, thereby improving the easiness and smoothness of the moving process.

Figure 7:
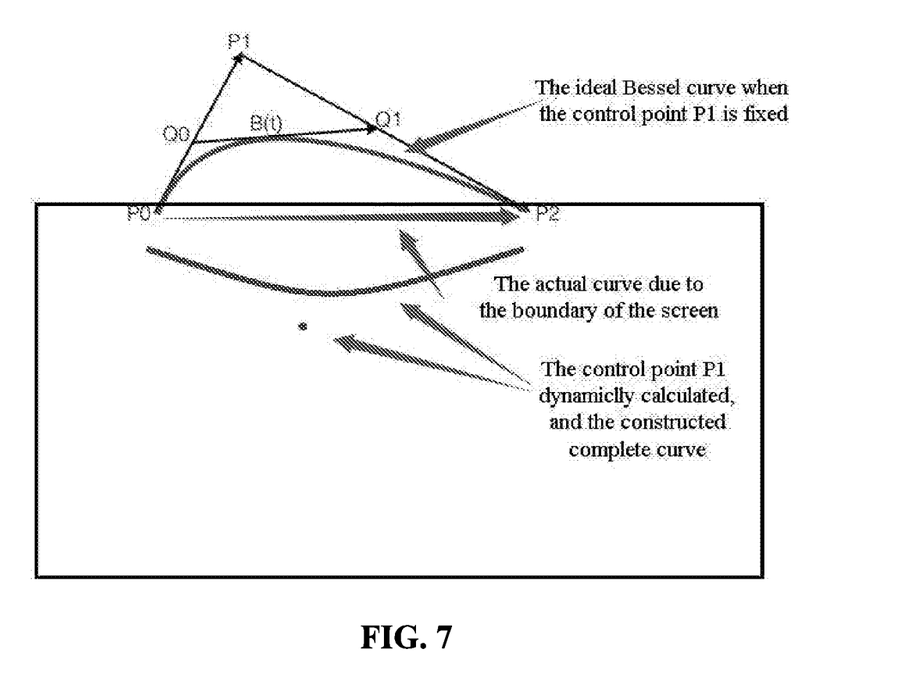
FIG. 7 is an schematic illustration of the effect of dynamically calculating coordinates of a control point of a second-order Bezier curve according to a moving method of the present application.

Preferably, in step S5, coordinates (X, Y) of a control point $P_1$ of the second-order Bezier curve is dynamically calculated, so that the second-order Bezier curve corresponding to the curve path is completely within the screen. As shown in FIG. 7, the rectangular box represents the screen boundary. When the starting point $P_0$ and the ending point $P_2$ are both close to the screen boundary (such as the upper edge of the screen), if the control point $P_1$ is set according to the rule of globally consistency, for example, the control point $P_1$ is always located on the left side of the connecting line $P_0 P_2$ between the starting position and the target position, the control point P1 may be located on the outside of the screen, and the ideal Bezier curve is almost fully located on the outside of the screen. In this case, the floating toolbar can only move along the screen boundary during the moving process, so that its actual curve becomes an approximate straight line adhere to the upper edge of the screen as shown in FIG. 7, thus, the visual effect is greatly compromised. For this case, in the moving method according to the present application, the coordinates (X, Y) of the control point $P_1$ are dynamically calculated so that they are always located inside the screen. For example, in this case, the control point P1 is located on the right side of the connecting line $P_0 P_2$ between the starting position and the target position, so that a complete Bezier curve can be constructed inside the screen to ensure the visual effect during the moving process.

In a preferred embodiment, in step S5, a process of dynamically calculating the coordinates (X, Y) of the control point $P_1$ of the second-order Bezier curve includes:

determining a screen edge closest to a starting position (that is, the starting point $P_0$) and the target position (that is, the ending point $P_2$) of the floating toolbar as a reference edge;

determining whether distances from the starting position and the target position to the reference edge are both greater than or equal to a fifth threshold;

if not, setting the control point $P_1$ on a first side of a connecting line $P_0 P_2$ between the starting position and the target position, where, the first side refers to a side of the connecting line $P_0 P_2$ away from the reference edge.

In this embodiment, if the determination result is false, it means that the distance from at least one of the starting position and the target position to the reference edge (i.e. the closest screen edge) is less than the fifth threshold, that is, it is relatively close to the reference edge. At this time, the control point $P_1$ may be set on the first side of the connecting line $P_0 P_2$, so that it can be ensured that the Bezier curve at this time is completely located on the inside of the screen. If the determination result is true, it means that the distances from the starting position and the target position to the reference edge are both relatively large. At this time, the control point $P_1$ may be set on either of the first side or the second side of the connecting line $P_0 P_2$, with that the Bezier curve is completely located on the inside of the screen can be ensured in either case.

In the present implementation, the closest edge of the screen refers to: the edge of the screen with the smallest distances with the staring position and the target position when the distances from the starting position and target position to the four edges of the screen are compared to each other, i.e. the edge of the screen that is relatively close to both of the staring position and the target position. Specifically, when determining that edge of the screen, the distances from the starting position and the target position to any one of the edges of the screen may be summed or averaged, and the edge of the screen with the smallest result is an adjacent edge of the screen. For example, if both the start position and the target position are located on the left side of the screen with one of them being close to the upper edge of the screen and the other being close to the lower edge of the screen, then the left edge of the screen is the closest screen edge. In the case shown in FIG. 7, the upper edge of the screen is the closest screen edge.

In another preferred embodiment, in step S5, a process of dynamically calculating the coordinates (X, Y) of the control point $P_1$ of the second-order Bezier curve includes:

selecting a left edge (the X direction coordinate thereof is zero) or an upper edge (the Y direction coordinate thereof is zero) of the screen as a reference edge, and determining whether a starting position (that is, the starting point $P_0$) and the target position (that is, the ending point $P_2$) of the floating toolbar both meet the following condition: distances from the starting position and the target position of the floating toolbar to the reference edge are greater than or equal to a fifth threshold; when the distances are not both greater than or equal to the fifth threshold, setting the control point $P_1$ on a first side of a connecting line $P_0P_2$ between the starting position and the target position; when the distances are both greater than or equal to the fifth threshold, setting the control point $P_1$ on a second side of the connecting line $P_0P_2$; where, the first side refers to a side of the connecting line $P_0P_2$ away from the reference edge, and the second side refers to a side of the connecting line close to the reference edge.

In the present embodiment, since the edge with the coordinate of zero is selected as the reference edge, the calculation process can be simplified when calculating the distances from the starting position and the target position to the reference edge, that is, alternatively, the corresponding coordinate values of the starting position and the target position may be directly used, thereby further improving the calculation efficiency.

In the present embodiment, if the distances from the starting position and the target position to the reference edge are both greater than or equal to the fifth threshold, it means that both of the starting position and the target position are at certain distances from the reference edge (it can be considered that they are relatively far away from the reference edge). Therefore, the control point $P_1$ may be set on the second side of the connecting line $P_0P_2$, that is, it is set between the connecting line $P_0P_2$ and the reference edge, which can ensure that the Bezier curve is completely located on the inside of the screen; when it is not the above case, that is, if at least one of the starting position and the target position does not meet the above condition, it means that there is one of the positions relatively close to the reference edge. At this time, the control point $P_1$ is set on the first side of the line $P_0P_2$ to ensure that the Bezier curve is completely located on the inside of the screen.

Figure 8:
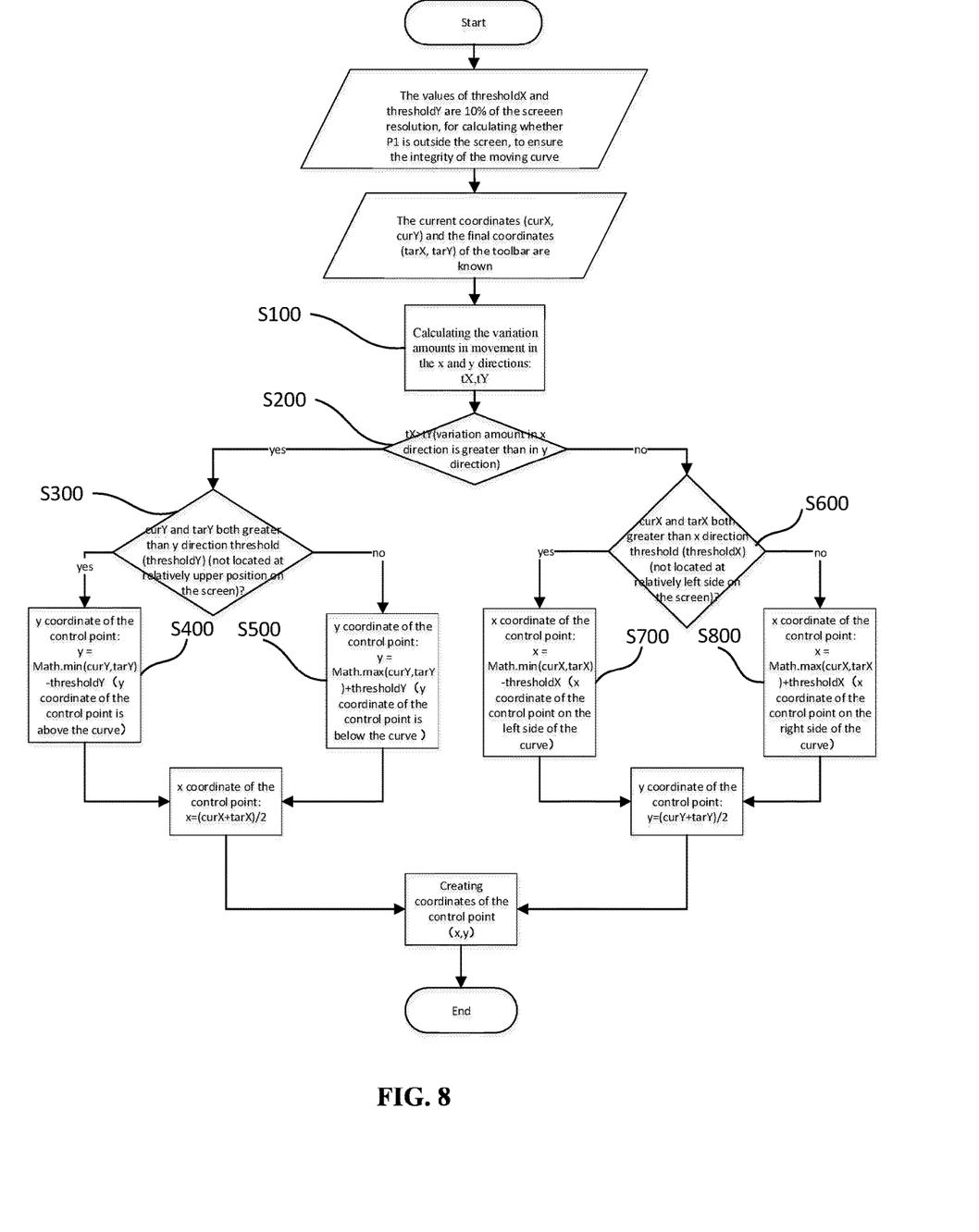
FIG. 8 is a flowchart of a preferred embodiment of dynamically calculating coordinates of a control point according to a moving method of the present application.

Preferably, in an embodiment in which the left edge or the upper edge of the screen is taken as the reference edge, referring FIG. 8, and in step S5, the process of selecting the reference edge includes:

S100: calculating coordinate variation amounts from the starting position to the target position, where an X direction coordinate variation amount is recorded as tX, and a Y direction coordinate variation amount is recorded as tY; where, tX=tarX−curX, tY=tarY−curY, tarX and tarY are an X direction coordinate value and a Y direction coordinate value of the target position respectively, and curX and curY are an X direction coordinate value and a Y direction coordinate value of the starting position respectively;

S200: comparing tX with tY, and when tX>tY, that is, the moving distance in the horizontal direction is relatively large and the slope of the above-mentioned connecting line $P_0P_2$ is relatively small, then selecting the upper edge of the screen as the reference edge; otherwise, the moving distance in the vertical direction is relatively large, and the slope of the above-mentioned line $P_0P_2$ is relatively large, then selecting the left edge of the screen as the reference edge.

Preferably, still referring FIG. 8, in step S5, in step S5, when tX>tY holds, that is, the upper edge of the screen is selected as the reference edge, then the coordinates of the control point $P_1$ (X, Y) are determined according to the following steps:

S300: determining whether curY and tarY both are greater than or equal to the fifth threshold, if so, it means that neither of the starting position and the target position is located at a relatively upper position on the screen, then proceeding to step S400; and if not, it means that at least one of the starting position and the target position is located at a relatively upper position on the screen, then proceeding to step S500;

S400: setting a Y direction coordinate of the control point $P_1$ as: Y=Math.min(curY, tarY)−the fifth threshold; setting an X direction coordinate of the control point $P_1$ as: X=(curX+tarX)/2; where, Math.min is a minimum value function;

S500, setting the Y direction coordinate of the control point $P_1$ as: Y=Math.max(curY, tarY)+the fifth threshold; setting the X direction coordinate of the control point $P_1$ as: X=(curX+tarX)/2; where, Math.max is a maximum value function.

As what is compared with the fifth threshold is the Y direction coordinates of the starting position and the target position, the fifth threshold may be expressed as a thresholdY, that is, a Y direction threshold.

Preferably, still referring to FIG. 8, in step S5, if tX>ty does not hold, that is, the left edge of the screen is selected as the reference edge, the coordinates (X, Y) of the control point P1 are determined as follows:

S600: determining whether curX and tarX both are greater than or equal to the fifth threshold, if so, it means that neither of the starting position and the ending position is located on the relatively left side of the screen, then proceeding to step S700; and if not, it means that at least one of the starting position and the target position is located on the relatively left side of the screen, then proceeding to step S800;

S700: setting an X direction coordinate of the control point $P_1$ as: X=Math.min (curX, tarX)−the fifth threshold; setting a Y direction coordinate of the control point $P_1$ as: Y=(curY+tarY)/2; where, Math.min is a minimum value function;

S800: setting the X direction coordinate of the control point $P_1$ as: X=Math.max(curX, tarX)+the fifth threshold; setting the Y direction coordinate of the control point $P_1$ as: Y=(curY+tarY)/2; where, Math.max is a maximum value function.

As what is compared with the fifth threshold is the X direction coordinates of the starting position and the target position, the fifth threshold may be expressed as a thresholdX, that is, an X direction threshold.

Thus, it is possible to create appropriate control point coordinates (X, Y) in any case, so that the Bezier curve is always on the inside of the screen.

Preferably, the fifth threshold is in a range of 5% to 20% of the screen resolution, preferably 10%, in order to make the curve path followed by the floating toolbar moving more graceful, that is, the bending degree of the Bezier curve is moderate. Specifically, when the fifth threshold is the thresholdX in the X direction, the fifth threshold is taken in a range of 5% to 20% of the screen resolution in the X direction, preferably 10%; when the fifth threshold is the thresholdY in the Y direction, the fifth threshold is taken in a range of 5% to 20% of the screen resolution in the Y direction.

Preferably, still referring to FIG. 8, in the process of dynamically calculating the coordinates (X, Y) of the control point $P_1$, before determining the starting position (that is, the current coordinates of the toolbar) and the target position (that is, the coordinates that the toolbar is finally moved to), the corresponding fifth threshold, including the thresholdX and the thresholdY, may be set by the user for determining whether the control point $P_1$ is outside the screen in subsequent calculations, so as to ensure the integrity of the moving curve, and at the same time, to determine the bending degree of the curve. Of course, this step is not necessary, and the thresholdX and the thresholdY may be uniformly set by a manufacturer of the touch display apparatus before shipment from a factory.

In a preferred embodiment of the moving method of the floating toolbar according to the present application, when the user presses on any position of the screen by two fingers, the main control can calculate the coordinate position of the center point between the two fingers performing the touching and instruct the floating toolbar to move to that position, so that the user does not need to move the toolbar in a manner of dragging the toolbar, instead, the toolbar can be automatically moved in a more convenient and fast manner, which not only simplifies all operations before the toolbar is moved to the target position, such as looking for the toolbar and dragging the toolbar, but also in the automatic moving process of the toolbar, animation and Bezier curve moving paths are used as assistance, thus, the man-machine interactivity is greatly improved On the basis of the above work, a second aspect of the present application further provides a touch display apparatus, which can facilitate the user to move and use the floating toolbar, thereby greatly improving the user's use experience.

Specifically, the touch display apparatus according to the present application has a touch screen, where the touch screen displays a floating toolbar thereon when in a working state, where, when more than two touch points on the touch screen are simultaneously touched, the touch display apparatus is configured to move the floating toolbar using the moving method described above according to the present application.

Preferably, the touch display apparatus is a smart interactive tablet or an interactive display screen, which can be used for various different occasions and purposes such as teaching, meeting, demonstration and the like.

It will be appreciated by those skilled in the art that the various preferred embodiments described above can be freely combined, superimposed without conflict.

It should be understood that the above embodiments are only used for illustrating the technical solutions of the present application, and not for limiting the same, and those skilled in the art can modify the technical solutions described in the above embodiments or replace some technical features of the above embodiments equivalently, and all such modifications and substitutions are intended to be included within the scope of the claims appended hereto.

What is claimed is:

1. A moving method of a floating toolbar in a touch display apparatus, comprising:
    S1: acquiring touch data on a touch screen;
    S2: acquiring, according to the touch data, touch position information of touch points simultaneously touched, number information of the touch points simultaneously touched and simultaneous touch duration information of the touch points simultaneously touched;
    S3: determining whether a number of the touch points simultaneously touched meets a first preset condition and whether a simultaneous touch duration of the touch points simultaneously touched meets a second preset condition, and when both the first preset condition and the second preset condition are met, proceeding to step S4;
    S4: determining a target position of the floating toolbar according to touch positions of the touch points simultaneously touched;
    S5: moving the floating toolbar to the target position.

2. The moving method according to claim 1, wherein, in step S4, the target position is within a predetermined distance from any one of the touch points simultaneously touched.

3. The moving method according to claim 1, wherein, in step S4, the target position is located between the touch points simultaneously touched.

4. The moving method according to claim 3, wherein, in step S4, the target position is located at a middle position between two touch points of the touch points simultaneously touched.

5. The moving method according to claim 1, wherein, in step S5, before moving the floating toolbar, whether the floating toolbar is in an expanded state is determined first, and when it is determined the floating toolbar is in the expanded state, an operation of collapsing the floating toolbar is performed before moving the floating toolbar.

6. The moving method according to claim 5, wherein, in step S5, after moving the floating toolbar is completed, the floating toolbar is placed in the expanded state.

7. The moving method according to claim 5, wherein, in step S5, a collapsing process of the floating toolbar is displayed in a form of animation.

8. The moving method according to claim 6, wherein, in step S5, an expanding process of the floating toolbar is displayed in a form of animation.

9. The moving method according to claim 1,
    wherein, the first preset condition comprises: whether the number of the touch points simultaneously touched is greater than or equal to a first threshold; and/or,
    the second preset condition comprises: whether the simultaneous touch duration of the touch point simultaneously touched is greater than or equal to a second threshold.

10. The moving method according to claim 1, wherein, in step S2, moving distance information of the touch points simultaneously touched is also acquired according to the touch data;
    in step S3, it is also determined whether a moving distance of any one of the touch points is less than or equal to a third threshold, and the moving method proceeds to step S4 only when a determination result is true.

11. The moving method according to claim 1, wherein, in the step S2, spacing information between the touch points simultaneously touched is also acquired according to the touch data;
    in step S3, it is also determined whether a spacing between any two of the touch points is less than or equal to a fourth threshold, and the method proceeds to step S4 only when a determination result is true.

12. The moving method according to claim 1, wherein, in step S5, the floating toolbar is moved along a curve path.

13. The moving method according to claim 1, wherein, the curve path is determined according to a second-order Bezier curve.

14. The moving method according to claim 13, wherein, in step S5, coordinates (X, Y) of a control point of the second-order Bezier curve is dynamically calculated, so that the second-order Bezier curve corresponding to the curve path is completely within the screen.

15. The moving method according to claim 14, wherein, in step S5, a process of dynamically calculating the coordinates (X, Y) of the control point of the second-order Bezier curve comprises:
- determining a screen edge closest to a starting position and the target position of the floating toolbar as a reference edge;
- determining whether distances from the starting position and the target position to the reference edge are both greater than or equal to a fifth threshold;
- when the distances are not both greater than or equal to the fifth threshold, setting the control point on a first side of a connecting line between the starting position and the target position, wherein, the first side refers to a side of the connecting line away from the reference edge.

16. The moving method according to claim 14, wherein, in step S5, a process of dynamically calculating the coordinates (X, Y) of the control point of the second-order Bezier curve comprises:
- selecting a left edge or an upper edge of the screen as a reference edge, and determining whether a starting position and the target position of the floating toolbar both meet the following condition: distances from the starting position and the target position of the floating toolbar to the reference edge are greater than or equal to a fifth threshold; when the distances are not both greater than or equal to the fifth threshold, setting the control point on a first side of a connecting line between the starting position and the target position; when the distances are both greater than or equal to the fifth threshold, setting the control point on a second side of the connecting line; wherein, the first side refers to a side of the connecting line away from the reference edge, and the second side refers to a side of the connecting line close to the reference edge.

17. The moving method according to claim 16, wherein, in step S5, a process of selecting the reference edge comprises:
- S100: calculating coordinate variation amounts from the starting position to the target position, wherein an X direction coordinate variation amount is recorded as tX, and a Y direction coordinate variation amount is recorded as tY; wherein, tX=tarX−curX, tY=tarY−curY, tarX and tarY are an X direction coordinate value and a Y direction coordinate value of the target position respectively, and curX and curY are an X direction coordinate value and a Y direction coordinate value of the starting position respectively;
- S200: comparing tX with tY, and when tX>tY, selecting the upper edge of the screen as the reference edge, otherwise, selecting the left edge of the screen as the reference edge.

18. The moving method according to claim 17, wherein, in step S5, when tX>tY holds, the coordinates of the control point (X, Y) are determined according to the following steps:
- S300: determining whether curY and tarY both are greater than or equal to the fifth threshold, if so, proceeding to step S400, and if not, proceeding to step S500;
- S400: setting a Y direction coordinate of the control point as: Y=Math.min(curY, tarY)−the fifth threshold; setting an X direction coordinate of the control point as: X=(curX+tarX)/2; wherein, Math.min is a minimum value function;
- S500: setting the Y direction coordinate of the control point as: Y=Math.max (curY, tarY)+the fifth threshold; setting the X direction coordinate of the control point as: X=(curX+tarX)/2; wherein, Math.max is a maximum value function.

19. The moving method according to claim 17, wherein, in step S5, when tX>tY does not hold, the coordinates of the control point (X, Y) is determined according to the following steps:
- S600: determining whether curX and tarX both are greater than or equal to the fifth threshold, if so, proceeding to step S700, and if not, proceeding to step S800;
- S700: setting an X direction coordinate of the control point as: X=Math.min(curX, tarX)−the fifth threshold; setting a Y direction coordinate of the control point as: Y=(curY+tarY)/2; wherein, Math.min is a minimum value function;
- S800: setting the X direction coordinate of the control point as: X=Math.max (curX, tarX)+the fifth threshold; setting the Y direction coordinate of the control point as: Y=(curY+tarY)/2; wherein, Math.max is a maximum value function.

20. A touch display apparatus having a touch screen, wherein the touch screen displays a floating toolbar thereon when in a working state, and wherein, when more than two touch points on the touch screen are simultaneously touched, the touch display apparatus is configured to move the floating toolbar using a moving method, the method comprising:
- S1: acquiring touch data on a touch screen;
- S2: acquiring, according to the touch data, touch position information of touch points simultaneously touched, number information of the touch points simultaneously touched and simultaneous touch duration information of the touch points simultaneously touched;
- S3: determining whether a number of the touch points simultaneously touched meets a first preset condition and whether a simultaneous touch duration of the touch points simultaneously touched meets a second preset condition, and when both the first preset condition and the second preset condition are met, proceeding to step S4;
- S4: determining a target position of the floating toolbar according to touch positions of the touch points simultaneously touched;
- S5: moving the floating toolbar to the target position.

* * * * *